Patented Aug. 28, 1945

2,383,624

UNITED STATES PATENT OFFICE 2,383,624

RESIN

George Spiller, Wilmington, Del., assignor to Hercules Powder Company, Wilmington, Del., a corporation of Delaware No Drawing. Application April 22, 1941,
Serial No. 389,737

14 Claims. (Cl. 106—222)

This invention relates to mixed resinous esters of pentaerythritol or polypentaerythritol with a rosin acid and with an aliphatic unsaturated lower monobasic acid, to the method of making such esters, and to coating compositions made therewith.

Heretofore, ester gum has been widely used in combination with tung oil in the production of varnishes of a high degree of hardness, alkali resistance and water resistance. However, due to present world conditions, the cost of tung oil has risen sharply. Therefore, it is desirable to make available a resin which, when used with the soft oils such as linseed oil, will give a varnish reproducing or improving upon the properties of varnishes prepared from ester gum and tung oil.

It is an object of the present invention to make available to the art a resin of this type.

Another object is to make available a method for the production of such a resin.

Still another object is to prepare coating compositions with such a resin.

Still other objects will appear hereinafter.

In accordance with the present invention, the foregoing objects are accomplished by preparing a resinous mixed ester of pentaerythritol or a polypentaerythritol such as dipentaerythritol with a rosin acid and with an aliphatic unsaturated monobasic acid having not more than 10 carbon atoms. It is preferred to esterify substantially all of the hydroxyl groups presented by the pentaerythritol or the polypentaerythritol. Thus, pentaerythritol presents 4 hydroxyl groups, dipentaerythritol 6 hydroxyl groups, etc. Generally the produce is so prepared that the acid number is not over about 25. However, for many uses, resins with acid numbers above 25 are usable, especially where high acid numbers are necessary in order to obtain compatibility between the resin and a cellulose derivative. Therefore, resins with acid numbers of from 0 to 75 may be made in accordance with the present invention.

The polypentaerythritols may be considered to be formed by the inter-molecular condensation of 2 or more molecules of pentaerythritol with the elimination of a molecule of water and the forming of an ether bond. Thus, dipentaerythritol is obtained in substantial amounts in certain processes for the preparation of pentaerythritol by the reaction of acetaldehyde with formaldehyde in the presence of an alkali. Instead of using the pure or substantially pure alcohol, I may use mixtures thereof. Thus, I may use mixtures of pentaerythritol and dipentaerythritol obtained directly by certain processes for condensing acetaldehyde with formaldehyde, such mixtures containing up to 25% of dipentaerythritol, the balance being pentaerythritol. Instead of dipentaerythritol, I may use higher polypentaerythritols, such as tripentaerythritol.

As the rosin acid, I may use ordinary rosin such as wood rosin, gum rosin, or equivalent acidic materials such as the acids found in ordinary rosin such as abietic acid, pimeric acid, sapinic acid, etc. Instead of using rosin itself, I may use modified rosins which have been chemically modified so as to chemically change the rosin nucleus. For example, I may use heat treated rosin, isomerized rosin, polymerized rosin, hydrogenated rosin, disproportionated rosin, etc.

As the unsaturated lower aliphatic monobasic acid, I may use any such acid having not more than 10 carbon atoms. Thus I may use alpha-unsaturated monobasic acids such as acrylic acid and substituted acrylic acids of the general formula

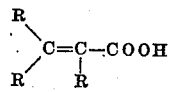

where R is either hydrogen or an alkyl group. Examples of such substituted acrylic acids are crotonic acid which is a beta methyl acrylic acid, isocrotonic acid, alpha methyl acrylic acid, beta ethyl acrylic acid, etc. Instead of the acrylic acids, I may employ acids which may be considered to be derived from acetic acid by the replacement of a hydrogen in the methyl group with an alkylene group. Examples of such acids are vinyl acetic acid, allyl acetic acid, angelic acid, tiglic acid, hydrosorbic acid, isohydrosorbic acid, pyroterebic acid, teracrylic acid, decenoic acid, etc. Of the acids enumerated, I prefer to use crotonic acid.

The relative molar amounts of the rosin acid of the unsaturated monobasic acid may be varied within very wide limits, from the case where the rosin acid occupies nearly all of the hydroxyl groups of the pentaerythritol or polypentaerythritol to the case where the monobasic acid occupies nearly all the hydroxyl groups. It is preferred, however, to use a molar excess of the rosin acid. Thus, I prefer to use the rosin acid in amount sufficient to combine with at least all but one of the hydroxyl groups of the alcohol. For example, in the case of pentaerythritol, I prefer to use at least about 3 mols of rosin acid per mol of pentaerythritol, varying upwardly to about 3.6 mols of rosin acid per mol of pentaerythritol. Likewise, in the case of dipentaerythritol, I prefer to use from about 5 to about 5.6 mols of the rosin acid per mol of dipentaerythritol. A substantial proportion of the hydroxyl groups of the alcohol which are not combined with the rosin acid should be combined with the unsaturated acid in order to give good water stability. In other words, in the preferred embodiment of my invention, I use from about 0.4 to about 1 mol of the unsaturated monobasic acid per mol of the alcohol.

The reaction to form the mixed esters of the present invention may be carried out by several procedures, among which are:

(1) Heat the mixture of rosin acid, the unsaturated monobasic acid and the pentaerythritol or dipentaerythritol to a temperature of from 285° C. to 300° C. until the desired acid number has been obtained.

(2) Heat the mixture of rosin acid and the unsaturated acid to a temperature of about 250° C. and hold for 2 hours. Add the pentaerythritol and heat the mixture to from 285° C. to 300° C. until the desired acid number has been obtained.

(3) Heat the mixture of rosin acid and the pentaerythritol or dipentaerythritol at from 285° C. to 300° C. until a low acid number has been obtained. Cool the mixture below 250° C., add the unsaturated monobasic acid, and heat the mixture to from 250° C. to 270° C. until the desired acid number has been obtained.

Preferably, an inert atmosphere as of carbon dioxide is maintained throughout the reaction by bubbling the gas slowly through the reaction mixture. Desirably, the products is sparged with such an inert gas in order to remove volatile impurities.

If desired, the esterification may be carried out in the presence of a non-reactive solvent such as mineral spirits, which is distilled off during the reaction. The use of such a solvent allows a shorter reaction time which is advantageous.

Below are given several specific examples showing the preparation of the resinous ester of the present invention.

*Example 1*

|  | Parts by weight | Relative molar amounts |
| --- | --- | --- |
| Polymerized rosin (M. P. 100° C., acid No. 150-155, assumed molecular weight, 360) | 2,000 | 2.78 |
| Crotonic acid | 140 | 0.81 |
| Pentaerythritol | 270 | 1.0 |

The polymerized rosin was heated to 100° C., whereupon the crotonic acid was added thereto. The mixture was heated to 250° C. and held there for 2¼ hours. The pentaerythritol was then added and the mixture heated to 290° C. and held there for 12¾ hours. Carbon dioxide was slowly bubbled through the reaction mixture throughout. The resulting mixture was given a carbon dioxide sparge for one hour. The resinous product had an acid number of 13, a softening point of 133° C. and a color of 80 amber+1.25 red.

*Example 2*

|  | Parts by weight | Relative molar amounts |
| --- | --- | --- |
| N wood rosin (acid No. 160-165, assumed molecular weight 340) | 1,000 | 2.95 |
| Crotonic acid | 70 | 0.81 |
| Pentaerythritol | 135 | 1.0 |

The rosin was heated to 100° C. and the crotonic acid added. The mixture was heated to 250° C. and held there for one hour. The pentaerythritol was then added and the mixture heated at 290° C. and held there for 5 hours whereupon it was allowed to cool at room temperature. The mixture was further heated to 290° C. for 6 hours. During the esterification period carbon dioxide was slowly bubbled through the reaction mixture. Following esterification, the mixture was sparged with carbon dioxide for one hour. The product had an acid number of 15, a softening point of 122° C. and a color of 30 amber.

*Example 3*

|  | Parts by weight | Relative molar amounts |
| --- | --- | --- |
| Polymerized rosin (same as in Example 1) | 1,000 | 4.48 |
| Crotonic acid | 70 | 1.3 |
| Dipentaerythritol | 155 | 1.0 |

These ingredients were reacted in exactly the same manner as in Example 2. The product had an acid number of 14, a softening point of 144° C. and a color of 50 amber.

*Example 4*

|  | Parts by weight | Relative molar amounts |
| --- | --- | --- |
| N wood rosin (same as in Example 2) | 1,000 | 3.18 |
| Crotonic acid | 35 | 0.44 |
| Pentaerythritol | 125 | 1.0 |

These ingredients were reacted together in precisely the same manner as in Example 2. The product had an acid number of 15, a softening point of 119° C. and a color of 37 amber.

*Example 5*

|  | Parts by weight | Relative molar amounts |
| --- | --- | --- |
| N wood rosin (same as in Example 2) | 1,000 | 2.95 |
| Crotonic acid | 61.5 | 0.715 |
| Pentaerythritol | 135 | 1.0 |

The rosin was heated to 100° C. and the pentaerythritol added. The mixture was heated to 285–295° C. and held there for 14 hours. The acid number had dropped below 15. The mixture was cooled to 200° C., the crotonic acid added, the mixture heated to 250° C., held there for 3 hours, heated to 275° C. and held there for 4 hours. Carbon dioxide was slowly bubbled through the reaction mixture throughout. The resulting mixture was given a carbon dioxide sparge for 1 hour. The resinous product had an acid number of 12.5, a softening point of 114° C., and a color of 30 amber.

I have found that excellent results may be obtained by using per 100 parts of rosin acid from 3.5 to 7 parts of crotonic acid, and 12.5 to 13.5 parts of pentaerythritol or 15.5 parts of dipentaerythritol. However, broader ranges may be used. Thus, per 100 parts of rosin acid, I may use from 1 to 30 parts of the unsaturated monobasic acid and from 10 to 30 parts of pentaerythritol or dipentaerythritol.

Preferably, an excess of alcohol, i. e. pentaerythritol or dipentaerythritol is employed in order to facilitate ready achievement of resins of low acid number. This excess may range from none to 20% over the theoretical. Use of a large excess brings about a very rapid lowering of acid number.

The resins prepared by the foregoing procedure are very well adapted to the production of superior coating compositions. Examples are varnishes prepared with the drying oils such as either the hard drying oils like tung oil or preferably the soft drying oils like linseed oil. Instead of linseed oil, I may use other similar oils such as dehydrated castor oil, soybean oil, Perilla oil, etc. The varnish may conveniently be prepared by bodying and reacting at a bodying temperature of from about 560° F. to about 630° F. a mixture of the resinous ester of the present invention and the pre-bodied soft drying oil. I prefer to pre-body the soft drying oil to a viscosity of at least Z on the Gardner-Holdt viscosity scale. The length of the varnish prepared may vary from 5 gallons to 100 gallons of the oil per hundred pounds of the resin. The varnishes prepared with the resin of the present invention are extremely fast-bodying in the kettle and dry rapidly to give superior films.

Examples of the preparation of cooked varnishes with the resin of the present invention follow.

Example 6

A resin was prepared as before from

|  | Parts by weight |
|---|---|
| Polymerized rosin (same as in Example 1) | 1000 |
| Crotonic acid | 133 |
| Pentaerythritol | 136 |

The resin had an acid number of 16.5 and a melting point of 152° C.

To make a varnish, 100 lbs. of this resin and 25 gallons of linseed oil previously bodied to a Gardner-Holdt viscosity of Z-3 were heated to 585° F. in 40 minutes, held there for 2 hours and 30 minutes, cooled and reduced to 50% solids with mineral spirits. The resulting varnish had a viscosity of I. When 0.5% of lead and 0.07% of cobalt were added as driers, the varnish dried rapidly to a hard, tough film which had a high water and alkali resistance.

Example 7

A resin was first prepared from

|  | Parts by weight |
|---|---|
| Polymerized rosin (same as in Example 1) | 1000 |
| Crotonic acid | 70 |
| Pentaerythritol | 135 |

The resin had an acid number of 19, softening point of 131° C. and color of 40 amber.

One hundred lbs. of this resin and 25 gallons of Z-4 viscosity bodied linseed oil were heated to 585° F. in 40 minutes, held there 1 hour and 40 minutes, cooled, and reduced to 50% solids with mineral spirits. The finished varnish had a viscosity of V and a color of 3 (Hellige). When 0.5% of lead and 0.07% of cobalt were added as driers, the varnish dried rapidly to a hard, tough film having very high water and alkali resistance.

Example 8

A resin was first prepared as before from

|  | Parts by weight |
|---|---|
| N wood rosin | 1000 |
| Crotonic acid | 70 |
| Dipentaerythritol | 155 |

This resin had a melting point of 128° C., an acid number of 17.5 and a color of 37 amber.

One hundred lbs. of this resin and 25 gallons of bodied linseed oil were heated to 585° F. in 40 minutes, held there 3 hours, cooled, and reduced to 50% solids with mineral spirits. The finished varnish had a viscosity of E and a color of 3L (Hellige).

Example 9

One hundred lbs. of the resin of Example 2 and 25 gallons of Z-4 viscosity bodied linseed oil were heated to 585° F. in 40 minutes, held there 3 hours and 55 minutes, cooled, and reduced to 50% solids with mineral spirits. The finished varnish had a viscosity of D and a color of 3L.

Instead of cooking the resin of the present invention with the drying oil to make a varnish, I may cold cut the resin with the drying oil in a suitable mutual solvent.

Alternatively, I may prepare a spirit varnish by dissolving the resin of the present invention in a suitable volatile organic solvent.

Or I may cold cut the resin of the present invention with an oil-modified alkyd resin (i. e. a polybasic acid-polyhydric alcohol resin modified during manufacture with a drying oil or a drying oil fatty acid), using mutual solvents for both. Still further, I may use the resin of the present invention in combination with the oil-soluble phenolic resins known in the art for cooking with drying oils in the preparation of varnishes especially adapted to particular uses.

Coating compositions embodying the resin of the present invention as an essential component display superior properties and are extremely advantageous for use wherever excellent durability, and alkali and water resistance are desired.

It will be understood that the details and examples hereinbefore set forth are illustrative only and that the invention as broadly described and claimed is in no way limited thereby.

What I claim and desire to protect by Letters Patent is:

1. As a new article of manufacture a hard, oil-soluble resinous ester of an alcohol selected from the group consisting of pentaerythritol and polypentaerythritols, and a mixture of acids, the said mixture essentially consisting of rosin acid and an aliphatic unsaturated monobasic acid having not more than 10 carbon atoms.

2. As a new article of manufacture a hard, oil-soluble resinous mixed ester of an alcohol selected from the group consisting of pentaerythritol and polypentaerythritols with a rosin acid in amount sufficient to combine with at least all but one of the hydroxyl groups presented by said alcohol, and with an aliphatic unsaturated monobasic acid having not more than 10 carbon atoms.

3. As a new article of manufacture a hard, oil-soluble resinous mixed ester of pentaerythritol with a rosin acid and an aliphatic unsaturated monobasic acid having not more than 10 carbon atoms, there being combined in said ester from about 3 to about 3.6 mols of said rosin acid and from about 0.4 to about 1 mol of said aliphatic acid per mol of pentaerythritol.

4. As a new article of manufacture a hard, oil-soluble resinous mixed ester of dipentaerythritol with a rosin acid and an aliphatic unsaturated monobasic acid having note more than 10 carbon atoms, there being combined in said ester from about 5 to about 5.6 mols of said rosin acid and from about 0.4 to about 1 mol of said aliphatic acid per mol of dipentaerythritol.

5. As a new article of manufacture a hard, oil-soluble resinous ester of an alcohol selected from the group consisting of pentaerythritol and polypentaerythritols with a mixture of acids essentially consisting of rosin acid and crotonic acid.

6. The process which comprises esterifying an alcohol selected from the group consisting of pentaerythritol and polypentaerythritols with acids essentially consisting of rosin acid and an aliphatic unsaturated monobasic acid having not more than 10 carbon atoms, the rosin acid being in amount sufficient to combine with at least all but one hydroxyl of the alcohol to form a hard, oil-soluble resinous ester.

7. A coating composition comprising as an essential ingredient a hard, oil-soluble resinous ester of an alcohol selected from the group consisting of pentaerythritol and polypentaerythritols with a mixture of acids essentially consisting of rosin acid and an aliphatic unsaturated monobasic acid having not more than 10 carbon atoms, in a liquid vehicle capable of forming a homogeneous solution therewith.

8. A coating composition comprising a hard, oil-soluble resinous ester of an alcohol selected from the group consisting of pentaerythritol and polypentaerythritols, and a mixture of acids, the said mixture essentially consisting of rosin acid and an aliphatic unsaturated monobasic acid having less than 10 carbon atoms, and a drying oil.

9. A varnish comprising a bodied and reacted mixture of a hard, oil-soluble resinous ester of an alcohol selected from the group consisting of pentaerythritol and polypentaerythritols, and a mixture of acids, the said mixture essentially consisting of rosin acid and an aliphatic unsaturated monobasic acid having less than 10 carbon atoms, and a drying oil.

10. A varnish comprising a bodied and reacted mixture of a hard, oil-soluble resinous ester of an alcohol selected from the group consisting of pentaerythritol and polypentaerythritols, and a mixture of acids, the said mixture essentially consisting of rosin acid and crotonic acid, and a soft drying oil.

11. The process of preparing a hard, oil-soluble resinous ester which comprises heating together an alcohol selected from the group consisting of pentaerythritol and polypentaerythritols with a mixture comprising a rosin acid and an aliphatic unsaturated monobasic acid having not more than 10 carbon atoms at a temperature between about 285° C. and about 300° C. until a resinous ester of the desired acid number is obtained, the rosin acid being in a quantity sufficient to combine with at least all but one of the hydroxyl groups of the alcohol reacted, and the basic acid being in a quantity between about 0.4 mol and 1 mol per mol of the alcohol.

12. The process of preparing a hard, oil-soluble resinous ester which comprises heating an alcohol selected from the group consisting of pentaerythritol and polypentaerythritols with rosin acid at a temperature between about 285° C. and about 300° C. until a reaction product of low acid number has been obtained, adding an aliphatic unsaturated monobasic acid having not more than 10 carbon atoms and heating the resulting mixture at a temperature between about 250° C. and about 270° C. until a resinous product of the desired acid number has been obtained, the rosin acid being in a quantity sufficient to combine with at least all but one of the hydroxyl groups of the alcohol reacted, and the basic acid being in a quantity between about 0.4 mol and 1 mol per mol of the alcohol.

13. The process of preparing a hard, oil-soluble resinous ester which comprises reacting 100 parts of rosin acid and from 1 to 30 parts of unsaturated aliphatic monobasic acid of less than 10 carbon atoms with from 10 to 30 parts of an alcohol selected from the group consisting of pentaerythritol and dipentaerythritol to form a mixed ester of the two acids with the alcohol utilized.

14. The process of preparing a hard, oil-soluble resinous ester which comprises reacting 100 parts of rosin acid and from 3.5 to 7 parts of crotonic acid with 12.5 to 13.5 parts of pentaerythritol to form a mixed ester of the rosin and crotonic acids with the pentaerythritol.

GEORGE SPILLER.